(12) United States Patent
Yoshino

(10) Patent No.: US 7,076,542 B2
(45) Date of Patent: Jul. 11, 2006

(54) EFFICIENT NETWORK MANAGEMENT SYSTEM AND METHOD OF MANAGING THE SAME BETWEEN NETWORK MANAGEMENT DEVICES AND MANAGEMENT OBJECT DEVICES

(75) Inventor: Shinichi Yoshino, Tokyo (JP)

(73) Assignee: NEC Corporation, Tokyo (JP)

(*) Notice: Subject to any disclaimer, the term of this patent is extended or adjusted under 35 U.S.C. 154(b) by 927 days.

(21) Appl. No.: 10/028,916

(22) Filed: Dec. 28, 2001

(65) Prior Publication Data
US 2002/0052946 A1 May 2, 2002

(30) Foreign Application Priority Data
Dec. 28, 2000 (JP) .............................. 2000-400850

(51) Int. Cl.
*G06F 15/173* (2006.01)

(52) U.S. Cl. ........................................ 709/223; 709/230

(58) Field of Classification Search ........ 709/223–230, 709/247, 245, 249; 707/101, 102, 4, 10; 370/401
See application file for complete search history.

(56) References Cited

U.S. PATENT DOCUMENTS 6,519,635 B1 * 2/2003 Champlin et al. .......... 709/223
6,704,780 B1 * 3/2004 Sethi ........................... 709/223

FOREIGN PATENT DOCUMENTS

| JP | H07-95235 A | 4/1995 |
| JP | H10-327199 A | 12/1998 |
| JP | 2000-216779 A | 8/2000 |

OTHER PUBLICATIONS

"Using SNMP to Manage Networks" by Peter Drake, Nov. 15, 1991, pp. 2/1-2/4 (via IEEE Xplore).*

* cited by examiner

*Primary Examiner*—Jeffrey Pwu
(74) *Attorney, Agent, or Firm*—Sughrue Mion, PLLC

(57) ABSTRACT

In a network management system, a data portion of an SNMP packet transmitted/received between an SNMP manager 10 (network management device) and an SNMP agent 20 (management object device) is compressed by a predetermined compression algorithm in a compression/decompression processing section 13, 22, when the SNMP packet is transmitted. The compressed SNMP packet is decompressed to be reproduced as the SNMP packet by the predetermined compression algorithm in the compression/decompression processing section 13, 22, when the compressed SNMP packet is received. Further, a compression indicating bit [1] is set on a predetermined bit position in the compressed SNMP packet in order to distinguish the SNMP packet from another SNMP packet transmitted/received between the SNMP manager 10 and an SNMP agent 120 (conventional management object device).

6 Claims, 10 Drawing Sheets

EFFICIENT NETWORK MANAGEMENT SYSTEM AND METHOD OF MANAGING THE SAME BETWEEN NETWORK MANAGEMENT DEVICES AND MANAGEMENT OBJECT DEVICES

BACKGROUND OF THE INVENTION

The present invention relates to a network management system and a method of managing a network which is for use in a network using SNMP (Simple Network Management Protocol) between a network management device for managing the network and a management object device connected to the network management device through the network to be managed thereby, in particular to a network management system and a method of managing a network which are capable of reducing load caused by SNMP packets flown on the network between the network management device and the management object device.

SNMP is one of protocols that are used in a system for carrying out, through an Internet, operations of managing a condition of a device constituting the Internet, such as a router, or the like.

In the interim, Internet Protocol (IP) has two protocols as protocols of a transport layer in a packet transfer. Namely, the two protocols are UDP (User Datagram Protocol) and TCP (Transmission Control Protocol). UDP is a connection-less type protocol for providing the function of IP to an upper layer substantially as it stands, compared with TCP that is a connection type protocol having a re-transmission function and a flow control function.

SNMP protocol for managing operations is originally operable upon the connection-less type UDP/IP in view of reducing load on the network. Under the situation, when managing data are transmitted by BER (Basic Encoding Rules) encoding method, an object identifier (ID) portion is added to each managing item. However, information is transferred inefficiently, since the object identifier (ID) portion comes up to ten and several bytes. As a result, as will later be described more in detail, load on the network becomes large in a conventional network management system, when many traps are generated from the management object device on the network between the management object device and the network management device. Further, load on the network also becomes large, when many "Get-request", "Set-request", and the like are issued from the network management device to the management object device on the network. Consequently, it is feared that the network is suppressed by the large load in the conventional network management system.

SUMMARY OF THE INVENTION

It is therefore an object of the present invention to provide a network management system and a method of managing a network which are capable of reducing load caused by SNMP packets flown on the network between the network management device and the management object device.

Other objects of the present invention will become clear as the description proceeds.

According to an aspect of the present invention, there is provided a method of managing a network which is for use in a network using SNMP (Simple Network Management Protocol) between a network management device for managing the network and a management object device connected to the network management device through the network to be managed thereby, the method comprising the steps of: compressing a data portion of an SNMP packet transferred between the network management device and the management object device by a predetermined compression algorithm to transmit the SNMP packet including the compressed data portion; and decompressing the compressed data portion of the SNMP packet by the predetermined compression algorithm to carry out a predetermined processing on the SNMP packet.

The network management device may memorize a plurality of the management object devices to which the predetermined compression algorithm is applicable, respectively, in a table, the network management device compressing only the SNMP packet directed to the management object device to which the predetermined compression algorithm is applicable and which is memorized in the table to form a transfer packet to be transmitted.

A bit "1" may be set on a predetermined bit position of a packet tag showing a kind of a packet to be formed in a case that the data portion has been compressed by the predetermined compression algorithm, and wherein a bit "0" may be set on the predetermined bit position of the packet tag showing a kind of a packet to be formed in the other case.

According to another aspect of the present invention, there is also provided a network management system which is for use in a network using SNMP (Simple Network Management Protocol) between a network management device for managing the network and a management object device connected to the network management device through the network to be managed thereby, comprising: a packet which is transferred between the network management device and the management object device and which has a bit position for setting a compression indicating bit showing that the packet has been compressed by a predetermined compression algorithm; the network management device including: a table for memorizing whether or not the predetermined compression algorithm is applicable to the management object device; a compression/decompression processing section which investigates, by the table, whether or not the predetermined compression algorithm is applicable to the management object device as a transmission destination, when SNMP packet is transmitted from the network management device; the compression/decompression processing section compressing the packet with the compression indicating bit being set on the bit position, when the predetermined compression algorithm is applicable to the management object device as the transmission destination; the compression/decompression processing section decompressing the packet, when the compression indicating bit is set on the bit position of SNMP packet received from the management object device; and a communication processing section which adds a predetermined header to the SNMP packet to form a transfer packet; the transfer packet being transmitted to a transmission destination; the communication processing section extracting the SNMP packet from a received transfer packet; the communication processing section transmitting the extracted SNMP packet to the compression/decompression processing section, when the compression indicating bit is detected from the bit position of the extracted SNMP packet.

The management object device may include; a communication processing section which is connected to the network management device through the network and which adds a predetermined header to the SNMP packet generated in the management object device to form a transfer packet; the transfer packet being transmitted to a transmission destination through the network; the communication processing section extracting the SNMP packet from a transfer packet received through the network; the SNMP packet being transmitted to an internal of the management object device; and a compression/decompression processing section which compresses SNMP packet directed to the network management device with the compression indicating bit being set on the bit position; the compression/decompression processing section decompressing the SNMP packet, when the compression indicating bit is set on the bit position of SNMP packet received from the management object device.

The communication processing section may transmit the extracted SNMP packet to the compression/decompression processing section, in a case that the compression indicating bit is set on the bit position of the extracted SNMP packet, the communication processing section canceling the received packet in the other cases.

DETAILED DESCRIPTION OF THE PREFERRED EMBODIMENT

Figure 1:
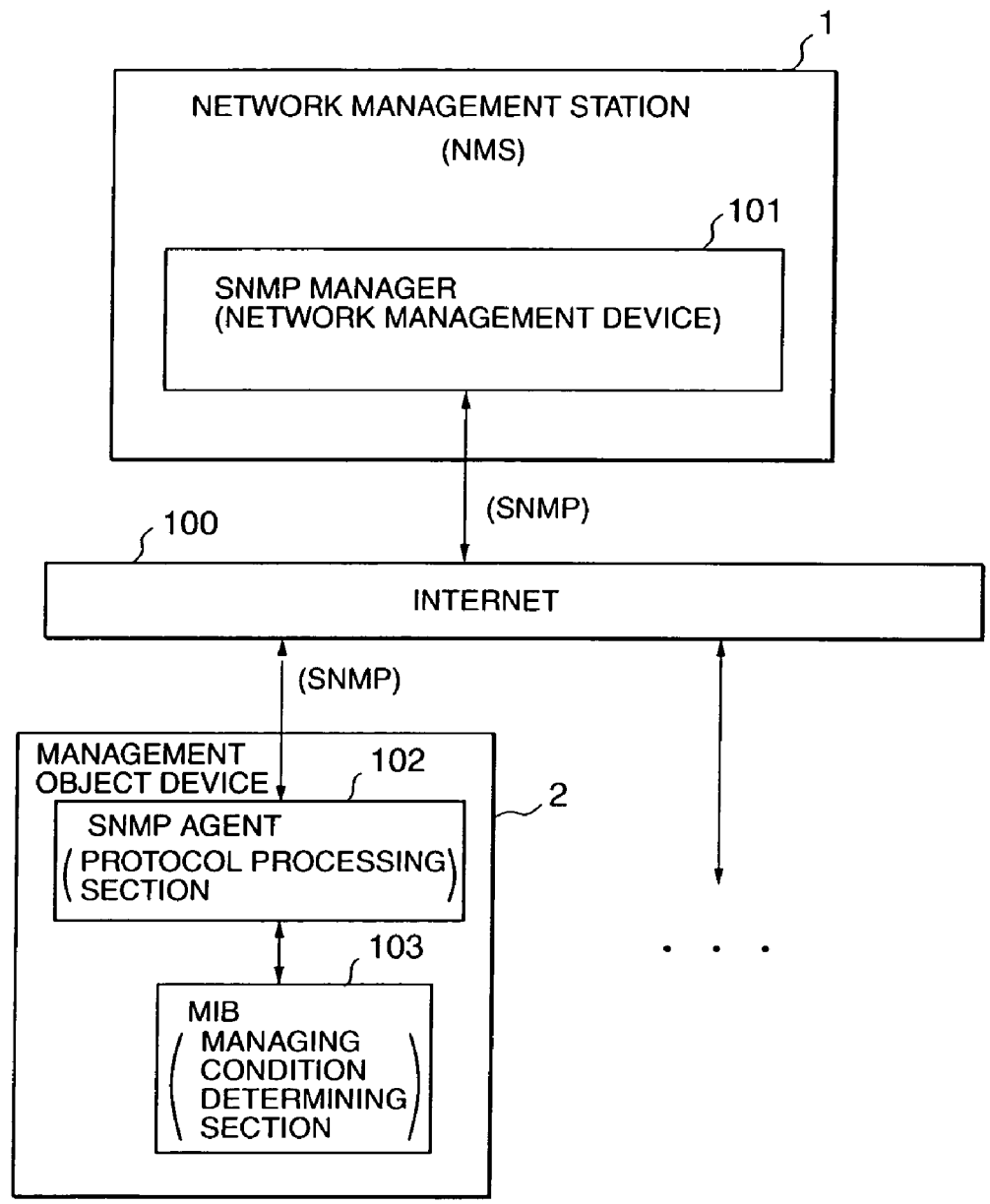
FIG. 1 is a schematic block diagram for showing an example of SNMP which is for use in a communication between an SNMP manager and an SNMP agent.
Figure 2:
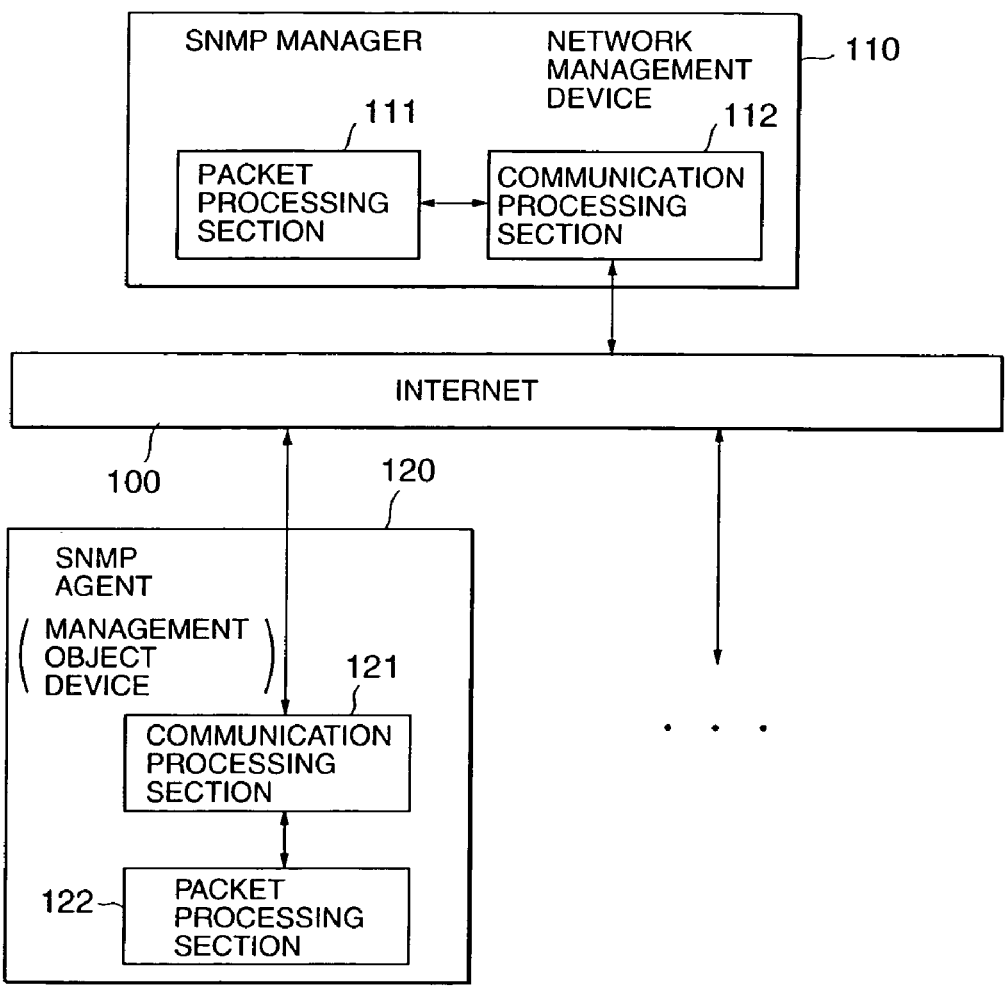
FIG. 2 is a schematic block diagram for showing an example of a conventional network management system.
Figure 3:
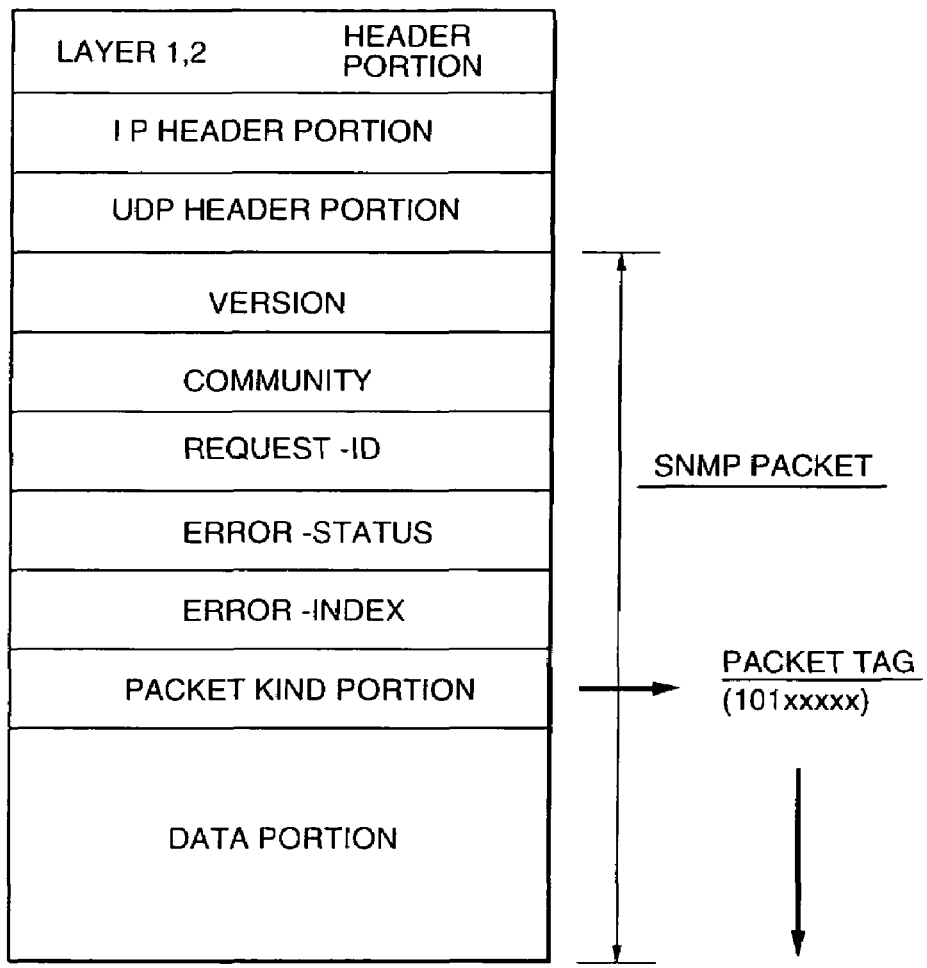
FIG. 3 is a schematic view for showing a format of a transfer packet used in the conventional network management system illustrated in FIG. 2.

Referring to FIGS. 1 through 3, description is, at first, made about a conventional network management system and a conventional method of managing a network in order to facilitate an understanding of the present invention. FIG. 1 is a schematic block diagram for showing an example of SNMP which is for use in a communication between an SNMP manager and an SNMP agent. FIG. 2 is a schematic block diagram for showing an example of a conventional network management system. FIG. 3 is a schematic view for showing a format of a transfer packet used in the conventional network management system illustrated in FIG. 2.

In FIG. 1, illustrated is an example of SNMP which is for use in a communication between an SNMP manager 101 and an SNMP agent 102. The SNMP manager 101 is a network management device of an NMS (Network Management Station) 1 while the SNMP agent 102 is a protocol processing section of a management object device 2. The management object device 2 further has an MIB (Management Information Base) 103 that is a managing condition determining section for previously determining a managing condition by a parameter. Accordingly, management of a condition of the management object device 2 is carried out by reading parameters of the MIB 103. Besides, a trouble of a device is reported from the SNMP agent 102 to the NMS 1 by a mechanism called "SNMP trap".

As illustrated in FIG. 2, such a conventional network management system, for example, comprises an SNMP manager (network management device) 110 and an SNMP agent (management object device) 120 connected to the SNMP manager (network management device) 110 through an Internet 100 as a network. Further, the SNMP manager (network management device) 110 comprises a packet processing section 111 and a communication processing section 112. On the other hand, the SNMP agent (management object device) 120 comprises a communication processing section 121 and a packet processing section 122.

Further, in FIG. 3, illustrated is an example of a transfer packet corresponding to "Get-request" packet, or the like transmitted from the SNMP manager 110. A transfer packet electrically transmitted and received upon the Internet 100 between the communication processing sections 112 and 121 is composed of a predetermined header portion and a predetermined SNMP packet. A packet tag of eight bits "101xxxxx" for showing the kind of the SNMP packet is included in the predetermined SNMP packet. A packet tag of eight bits "10100000" is, for example, assigned to the "Get-request" packet. On the other hand, a packet tag of eight bits "10100100" is assigned to "Trap" packet in the above-described mechanism called ("SNMP trap".

As mentioned in the preamble of the instant specification, SNMP protocol for managing operations is originally operable upon the connection-less type UDP/IP in view of reducing load on the network. Under the situation, when managing data are transmitted by BER (Basic Encoding Rules) encoding method, an object identifier (ID) portion is added to each managing item. However, information is transferred inefficiently, since the object identifier (ID) portion comes up to ten and several bytes. As a result, load on the network becomes large, when many traps are generated from the management object device on the network between the management object device and the network management device. Further, load on the network also becomes large, when many "Get-request", "Set-request", and the like are issued from the network management device to the management object device on the network. Consequently, it is feared that the network is suppressed by the large load.

Figure 4:
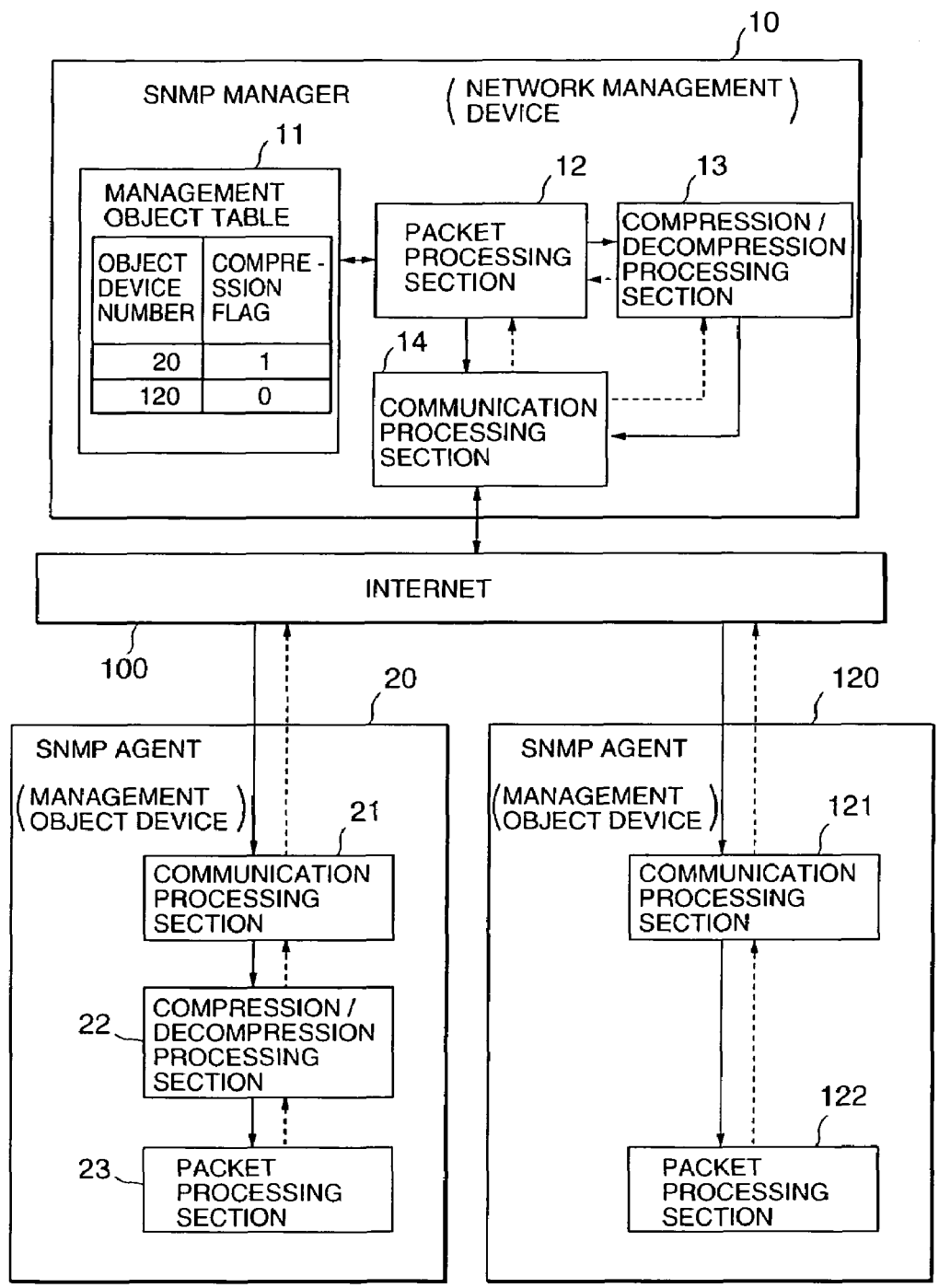
FIG. 4 is a schematic block diagram for showing a network management system according to a preferred embodiment of the present invention.

Now, referring to FIGS. 4 through 10, description will proceed to a network management system and a method of managing a network according to a preferred embodiment of the present invention. FIG. 4 is a schematic block diagram for showing a network management system according to the preferred embodiment of the present invention.

As illustrated in FIG. 4, the network management system according to the preferred embodiment of the present invention comprises an Internet 100 which is a network, an SNMP manager 10 which is a network management device, and a plurality of SNMP agents 20, 120 each of which is a management object device. The SNMP manager 10, the SNMP agents 20 and 120 are connected to each other by the Internet 100. The network management system according to the preferred embodiment illustrated in FIG. 4 has a structure similar to that of the conventional network management system illustrated in FIG. 2. Similar portions are designated by like reference numerals. Description about the similar portions is omitted accordingly.

The SNMP manager 10 comprises a management object table 11, a packet processing section 12, a compression/decompression (defrosting) processing section 13, and a communication processing section 14. Further, the SNMP agent 20 comprises a communication processing section 21, a compression/decompression (defrosting) processing section 22, and a packet processing section 23. On the other hand, the SNMP agent 120 is the conventional management object device illustrated in FIG. 2. The SNMP manager 10 manages both the SNMP agent 20 and the SNMP agent 120.

The management object table 11 is an area of compressed flags which are formed in a memory device (not shown) and which are corresponding to the SNMP agents 20, 120, respectively. The SNMP agent 20 has a predetermined compression algorithm as the above-mentioned compression/decompression (defrosting) processing section 22. In the management object table 11, for example, a bit "1" is previously set with respect to the numeral "20" of the object device number while a bit "0" is previously set with respect to the numeral "120" of the another object device number.

The packet processing section 12 reads the compressed flags corresponding to destinations, namely the SNMP agents 20, 120, respectively, from the management object table 11, when the packet processing section 12 issues "Get-request" packet, and the like. As a result, the packet processing section 12 makes an SNMP packet directed to the SNMP agent 20 of the compressed flag "1" and then sends the SNMP packet to the compression/decompression (defrosting) processing section 13.

Figure 5:
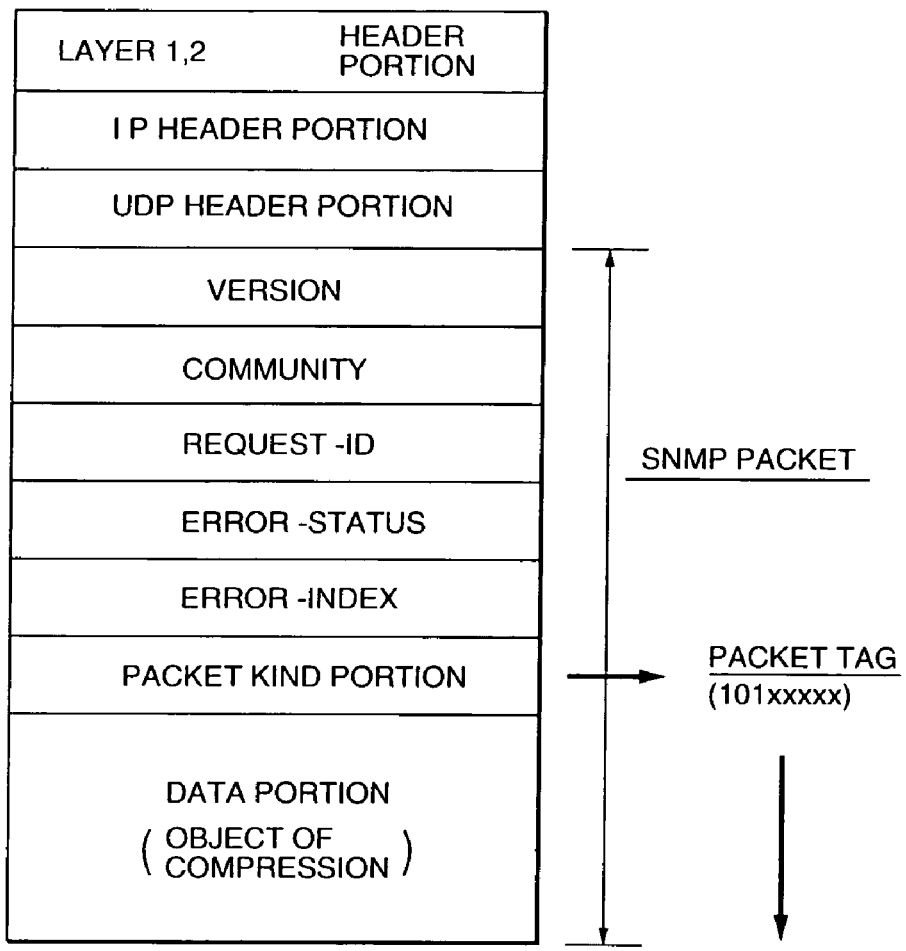
FIG. 5 is a schematic view for showing a format of a transfer packet used in the network management system illustrated in FIG. 4.

Now, referring to FIG. 5, description proceeds to the SNMP packet. FIG. 5 is a schematic view for showing a format of a transfer packet used in the network management system illustrated in FIG. 4. The SNMP packet illustrated in FIG. 5 has a composition similar to that of the conventional SNMP packet described with reference to FIG. 3. With the composition being illustrated, a header portion including the kind of the SNMP packet cannot be changed from its predetermined format, because received data are directly interpreted to deal with the packet. On the contrary, data portion can be compressed. Therefore, a compression indicating bit for showing the SNMP packet having been compressed is added to a packet tag expressed by eight bits "101xxxxx" of the packet kind portion.

Namely, as illustrated in FIG. 5, the fifth bit of each packet tag is used for the compression indicating bit. Consequently, a packet tag "1010xxxx" is assigned to each of non-compressed packets, for example, Get-request packet, Get-next-request packet, Get-response packet, Set-request packet, and Trap packet, for the conventional management object device. On the contrary, a packet tag "1011xxxx" is assigned to each of compressed packets, for example, Compressed Get-request packet, Compressed Get-next-request packet, Compressed Get-response packet, Compressed Set-request packet, and Compressed Trap packet, for the management object device of the present invention.

Accordingly, in the packet kind portion of an SNMP packet directed to the SNMP agent 20 for which the compressed flag is "1", a packet tag "1011xxxx" is provided based on its packet kind. In other words, the compression indicating bit "1" is set on a position of the fifth bit of each packet tag. On the other hand, in the packet kind portion of an SNMP packet directed to the SNMP agent 120 for which the compressed flag is "0", a packet tag "1010xxxx" is provided based on its packet kind. The SNMP packet directed thereto is then sent to the communication processing section 14. Namely, in this case, the compression indicating bit "0" is set on a position of the fifth bit of the packet tag.

Besides, the packet processing section 12 similarly carries out a predetermined processing on any SNMP packet received from the compression/decompression (defrosting) processing section 13 or the communication processing section 14, so that the packet processing section 12 provides the SNMP packet to internal management means (not shown).

The compression/decompression (defrosting) processing section 13 compresses predetermined object data among the SNMP packet received from the packet processing section 12. The compression/decompression (defrosting) processing section 13 then sends the SNMP packet including the compressed object data to the communication processing section 14. On the other hand, the compression/decompression (defrosting) processing section 13 decompresses (defrosts) a predetermined data portion of the SNMP packet received from the communication processing section 14. The compression/decompression (defrosting) processing section 13 then sends the SNMP packet including the decompressed (defrosted) data portion to the packet processing section 12.

The communication processing section 14 adds a predetermined header portion to the SNMP packet received from the packet processing section 12 or the compression/decompression (defrosting) processing section 13 to form a transfer packet. The communication processing section 14 then sends the transfer packet to the destinations, namely, the SNMP agents 20, 120 through the Internet 100. On the other hand, the communication processing section 14 receives the transfer packet from one of the SNMP agents 20 and 120 through the Internet 100. When the communication processing section 14 receives the transfer packet from one of the SNMP agents 20 and 120 through the Internet 100, the communication processing section 14 deletes the predetermined header portion from the SNMP (transfer) packet and reads the packet kind portion of the SNMP packet. The communication processing section 14 judges whether or not data have been compressed from the fifth bit of the packet tag in the packet kind portion of the SNMP packet. When data have not been compressed, the communication processing section 14 sends the SNMP packet to the packet processing section 12. On the contrary, when data have been compressed, the communication processing section 14 sends the SNMP packet to the compression/decompression (defrosting) processing section 13.

The communication processing section 21 of the SNMP agent 20 deletes a predetermined header portion from the transfer packet received from the SNMP manager 10 through the Internet 100. The communication processing section 21 confirms the compression indicating bit "1" by the fifth bit portion of the packet kind portion of the SNMP packet. The communication processing section 21 then sends the SNMP packet to the compression/decompression (defrosting) processing section 22. The communication processing section 21 never receive the fifth bit "0" by a record of the management object table 11. Therefore, if the communication processing section 21 read the fifth bit "0", the communication processing section 21 cancels the received SNMP packet to prevent the network from increase of load.

On the other hand, the communication processing section 21 adds a predetermined header portion to the SNMP packet received from the compression/decompression (defrosting) processing section 22 to form a transfer packet. The communication processing section 21 then sends the transfer packet to the SNMP manager 10 through the Internet 100.

The compression/decompression (defrosting) processing section 22 decompresses (defrosts) a predetermined data portion of the SNMP packet received from the communication processing section 21. The compression/decompression (defrosting) processing section 22 then sends the SNMP packet including the decompressed (defrosted) data portion to the packet processing section 23. The compression/decompression (defrosting) processing section 22 compresses a predetermined data portion of the SNMP packet received from the packet processing section 23. The compression/decompression (defrosting) processing section 22 then sends the SNMP packet including the compressed data portion to the communication processing section 21.

The packet processing section 23 sends the SNMP packet received from the compression/decompression (defrosting) processing section 22 to internal control means (not shown) for controlling a managing condition within the management object device. In addition, the packet processing section 23 makes an SNMP packet by the data to be sent to the SNMP manager 10. The packet processing section 23 set the compression indicating bit "1" on a position of the fifth bit of the packet tag in the packet kind portion of the SNMP packet. The packet processing section 23 then sends the SNMP packet including the compression indicating bit "1" in the packet tag to the compression/decompression (defrosting) processing section 22.

Figure 6:
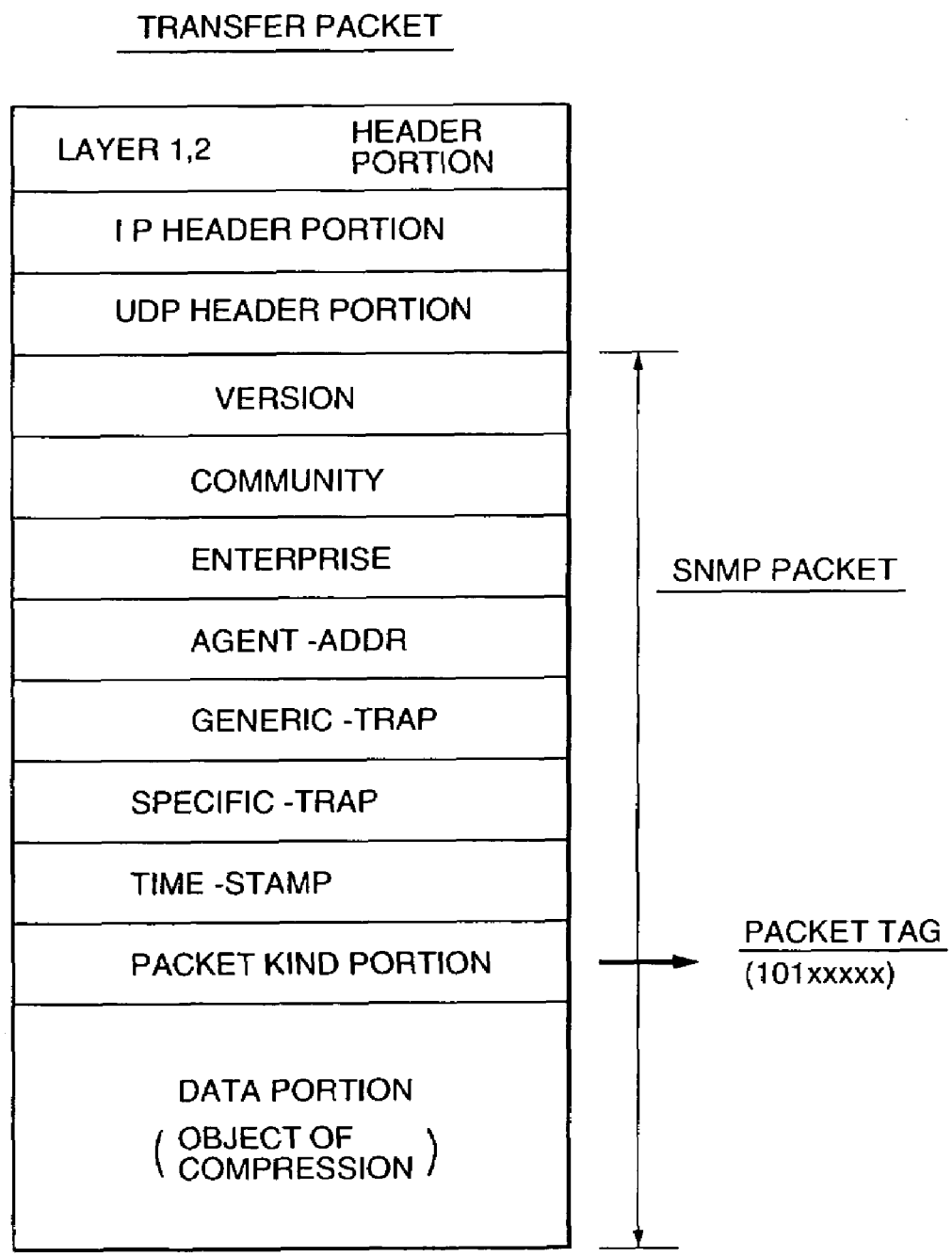
FIG. 6 is a schematic view for showing a format of another transfer packet (Trap packet) used in the network management system illustrated in FIG. 4.

FIG. 6 is a schematic view for showing a format of another transfer packet (Trap packet) used in the network management system illustrated in FIG. 4. In FIG. 6, illustrated is a composition of "Trap" packet sent from the SNMP agents 20, 120. As illustrated in FIG. 6, the illustrated SNMP packet, namely "Trap" packet has a packet kind portion similarly to the other SNMP packets. Also in the illustrated SNMP packet, namely "Trap" packet, it is shown by the compression indicating bit of each packet tag of the packet kind portion whether or not data portion have been compressed.

Figure 7:
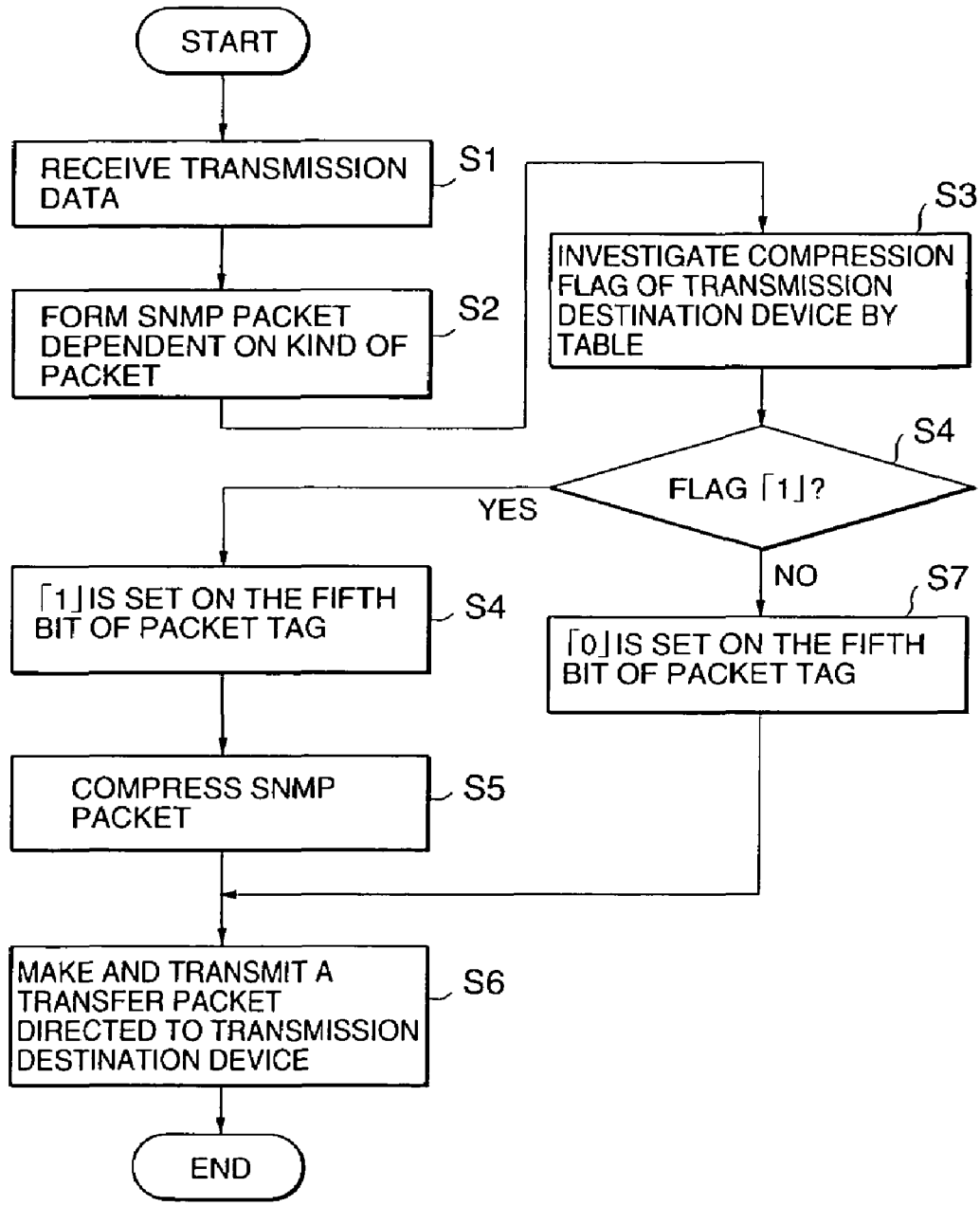
FIG. 7 is a flow chart for showing transmission process in an SNMP manager of the network management system according to the preferred embodiment of the present invention.

Next, referring to FIG. 7 with reference to FIGS. 4 and 5 continued, description will proceed to packet transmission processes by the SNMP manager 10 that is a network management device. FIG. 7 is a flow chart for showing the transmission processes in the SNMP manager 10 of the network management system according to the preferred embodiment of the present invention.

The SNMP manager 10 transmits the SNMP packets consisting of the kinds of packets, "Get-request", "Get-next-request", "Set-request" to the SNMP agent 20, that is, a management object device by the format illustrated in FIG. 5.

The packet processing section 12 receives transmission data for managing the network (S1), and then makes an SNMP packet, dependent on the kind of packets (S2). At that time, the packet processing section 12 investigates a compressed flag area of the management object table 11 by the transmission destination, namely, management object device 20 (S3).

When the compressed flag "1" is detected from the corresponding area (Yes in S4), the packet processing section 12 sets the compression indicating bit "1" on a position of the fifth bit of the packet tag expressing the kind of packets (S4). The packet processing section 12 then sends the SNMP packet to the compression/decompression (defrosting) processing section 13

The compression/decompression (defrosting) processing section 13 compresses data portion of the received SNMP packet by a predetermined compression algorithm (S5), and then send's the SNMP packet including the compressed data portion to the communication processing section 14. The communication processing section 14 adds a predetermined header portion to the SNMP packet received from the compression/decompression (defrosting) processing section 13 to form a transfer packet. The communication processing section 14 then sends the transfer packet to the management object device of a transmission destination, namely, the SNMP agent 20 through the Internet 100 (S6).

On the other hand, in a case that a transmission destination is the management object device 120, namely, the SNMP agent 120, the compressed flag "0" is detected from the management object table 11 as the result of the investigation of the above step S3. Judgement in the above step S4 therefore becomes "No". The packet processing section 12 sets the compression indicating bit "0" on a position of the fifth bit of the packet tag expressing the kind of packets (S7). The packet processing section 12 then sends the SNMP packet directly to the communication processing section 14. The communication processing section 14 carries out the above step S6.

Figure 8:
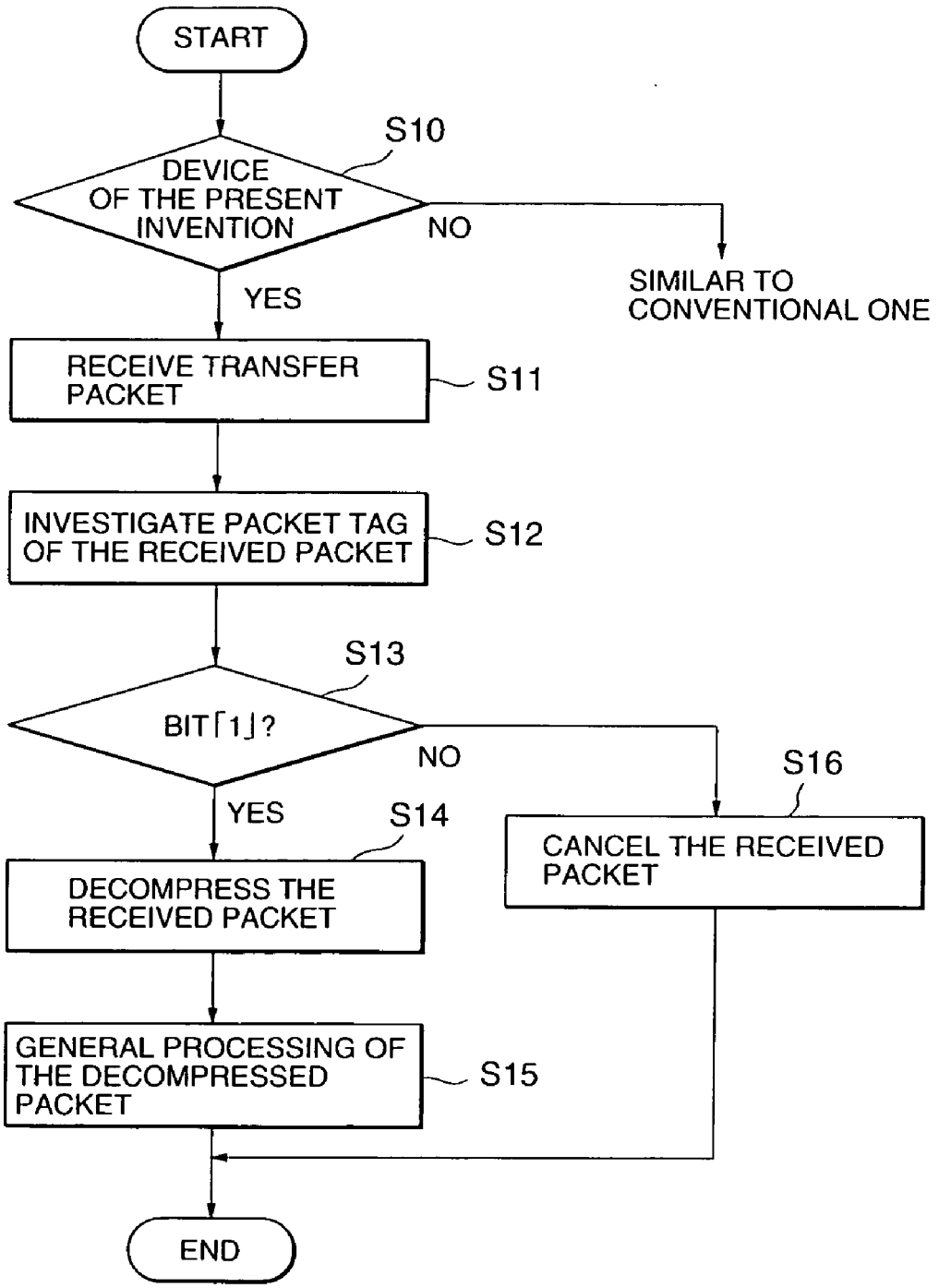
FIG. 8 is a flow chart for showing reception process in an SNMP agent of the network management system according to the preferred embodiment of the present invention.

Next, referring to FIG. 8 with reference to FIGS. 4, 5 and 7 continued, description will proceed to packet reception processes following to the above step S6 by the SNMP agent 20 that is a management object device. FIG. 8 is a flow chart for showing the reception processes in the SNMP agent 20 of the network management system according to the preferred embodiment of the present invention. Packet reception processes following to the step S10 by a management object device such as the SNMP agent 120 having no relation to the present invention (No in S10) is omitted.

If judgement is "Yes" in S10, in the SNMP agent 20, the communication processing section 21 receives a transfer packet including the compressed data portion (S11). The communication processing section 21 deletes a predetermined header portion from the received transfer packet to take the SNMP packet out of the received transfer packet. The communication processing section 21 then investigates the fifth bit of the packet tag expressing the kind of packets (S12).

As a result, when the compression indicating bit "1" is set on the fifth bit of the packet tag (Yes in S13), the communication processing section 21 then sends the received SNMP packet to the compression/decompression (defrosting) processing section 22. The compression/decompression (defrosting) processing section 22 decompresses (defrosts) the received SNMP packet (S14) to reproduce the data portion thereof. The compression/decompression (defrosting) processing section 22 then sends the SNMP packet including the reproduced or decompressed (defrosted) data portion to the packet processing section 23. The packet processing section 23 carries out general processing on the decompressed (defrosted) SNMP packet, similarly to the conventional one (S15). The packet processing section 23 then sends the decompressed (defrosted) SNMP packet to internal control means (not shown).

If judgement is "No" in the above step S13, namely, the compression indicating bit "0" is set on the fifth bit of the packet tag, the communication processing section 21 cancels the received SNMP packet (S16), and finishes the packet reception processes.

Figure 9:
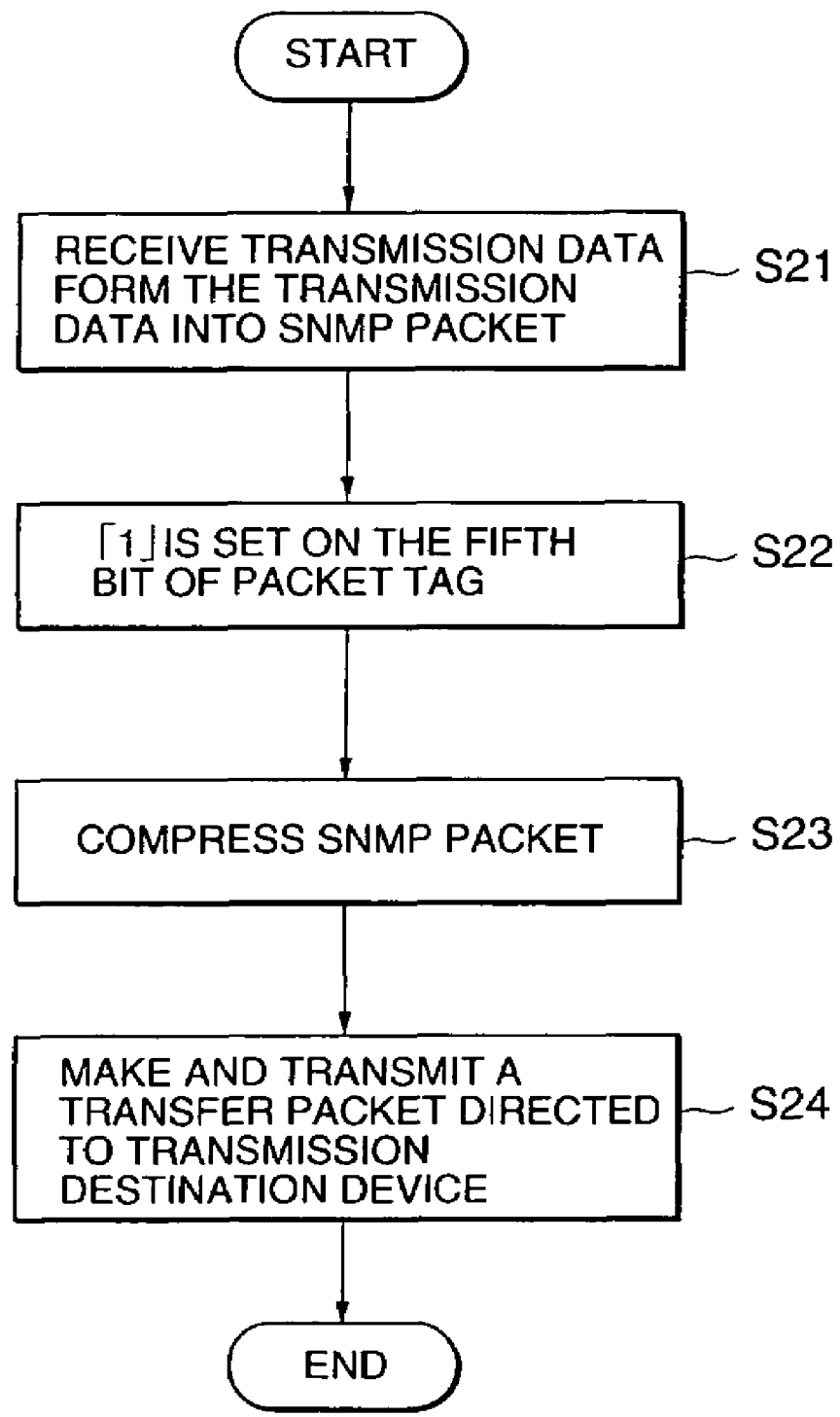
FIG. 9 is a flow chart for showing transmission process in an SNMP agent of the network management system according to the preferred embodiment of the present invention.

Next, referring to FIG. 9 with reference to FIGS. 4 and 5 continued, description will proceed to packet transmission processes by the SNMP agent 20 that is a management object device of the present invention. FIG. 9 is a flow chart for showing the transmission processes in the SNMP agent 20 of the network management system according to the preferred embodiment of the present invention.

The SNMP agent 20 transmits either the SNMP packet consisting of "Get-response" in the kind of packet illustrated in FIG. 5 or the SNMP packet consisting of "Trap" in the kind of packet illustrated in FIG. 6 to the SNMP manager 10 that is a network management device.

When the packet processing section 23 receives the transmission data, the packet processing section 23 makes an SNMP packet by a format dependent on the kind of packets (S21). At that time, the packet processing section 23 sets the compression indicating bit "1" on a position of the fifth bit of the packet tag expressing the kind of packets (S22). The packet processing section 23 then sends the SNMP packet to the compression/decompression (defrosting) processing section 22. The compression/decompression (defrosting) processing section 22 compresses data portion of the received SNMP packet by a predetermined compression algorithm (S23), and then sends the SNMP packet including the compressed data portion to the communication processing section 21. The communication processing section 21 adds a predetermined header portion to the SNMP packet received from the compression/decompression (defrosting) processing section 22 to form a transfer packet. The communication processing section 21 then sends the transfer packet to the SNMP manager 10 of the network management device through the Internet 100 (S24).

Figure 10:
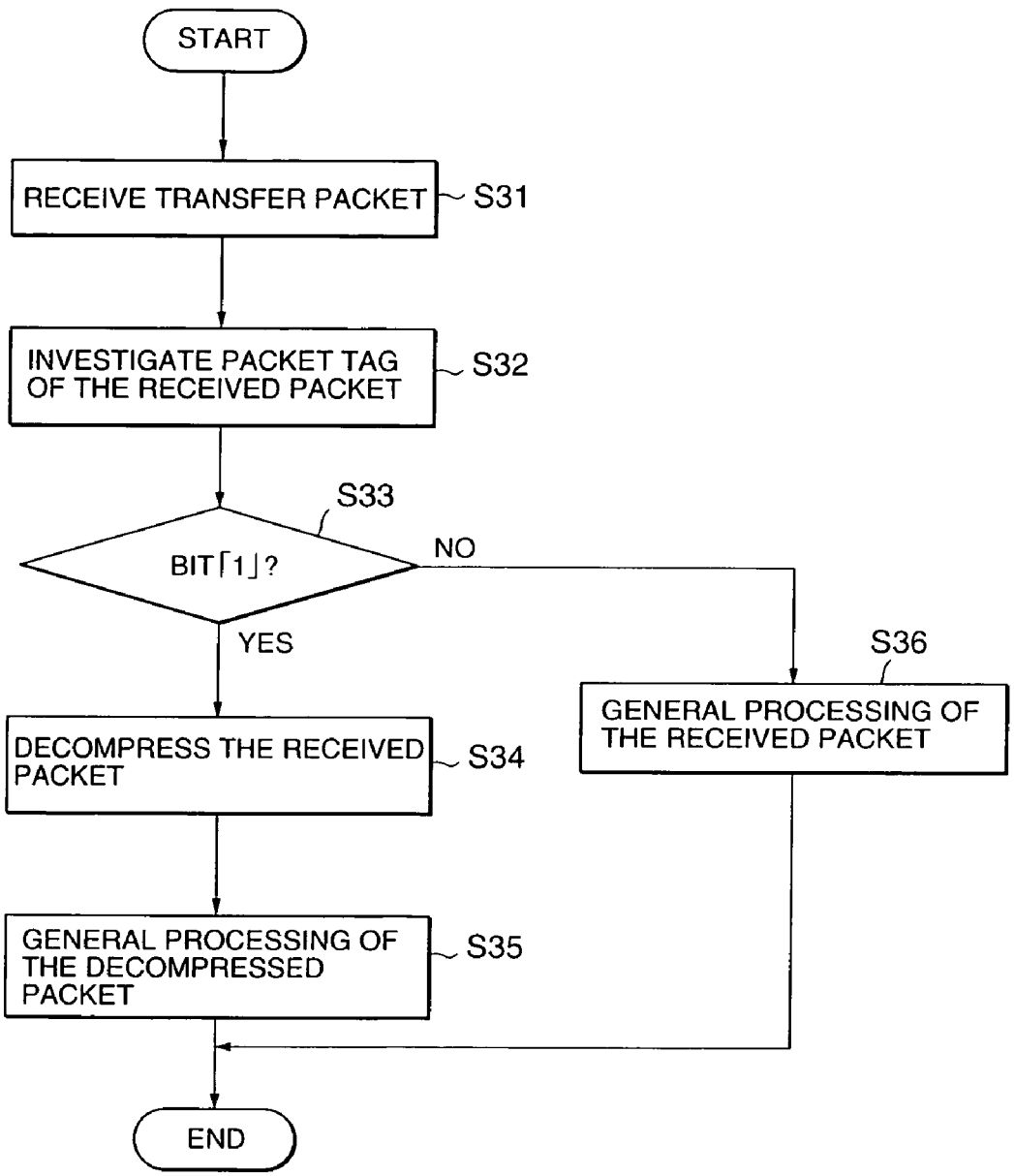
FIG. 10 is a flow chart for showing reception process in an SNMP manager of the network management system according to the preferred embodiment of the present invention.

Next, referring to FIG. 10 with reference to FIGS. 4 and 5 continued, description will proceed to packet reception processes by the SNMP manager 10 that is a network management device of the present invention. FIG. 10 is a flow chart for showing the reception processes in the SNMP manager 10 of the network management system according to the preferred embodiment of the present invention.

The communication processing section 14 receives the transfer packet through the Internet 100 (S31). The communication processing section 14 deletes a predetermined header portion from the received transfer packet to take the SNMP packet out of the received transfer packet. The communication processing section 14 then investigates the fifth bit of the packet tag expressing the kind of packets (S32).

As the result of the investigation, when the compression indicating bit "1" is detected on the fifth bit of the packet tag (Yes in S33), the communication processing section 14 then sends the received SNMP packet to the compression/decompression (defrosting) processing section 13. The compression/decompression (defrosting) processing section 13 decompresses (defrosts) the received SNMP packet (S34) to reproduce the data portion thereof. The compression/decompression (defrosting) processing section 13 then sends the SNMP packet including the reproduced or decompressed (defrosted) data portion to the packet processing section 12. The packet processing section 12 carries out general processing on the decompressed (defrosted) SNMP packet, similarly to the conventional one (S35).

On the other hand, judgement is "No" in the above step S33, namely, the compression indicating bit "0" is detected on the fifth bit of the packet tag, when a transmission source is the conventional SNMP agent 120. In this case, the communication processing section 14 then sends the SNMP packet directly to the packet processing section 12. The packet processing section 12 carries out general processing on the received SNMP packet (S36). The process of the step S36 is similar to that of the above step S35. As described above, according to the present invention, it is possible to reduce the load on the network due to SNMP packets flown between the devices. This is because a data portion can be compressed by a predetermined compression algorithm in the SNMP packet transmitted and received between the SNMP manager of a network management device and the SNMP agent of a management object device.

While this invention has thus far been described in conjunction with the preferred embodiment thereof, it will now be readily possible for one skilled in the art to put this invention into effect in various other manners. For example, in the preferred embodiment mentioned above, the compression indicating bits are detected in the SNMP packet transmitted from the packet processing section and in the SNMP packet received by the communication processing section, respectively. However, the compression/decompression (defrosting) processing section can carry out the compression/decompression (defrosting) processing, no processing, and detection of the compression indicating bit, respectively. In this case, a conventional packet processing section and a conventional communication processing section can be used as it stands, respectively. Further, although the above-mentioned steps are serial operations, some operations can be processed in parallel. Moreover, the above-mentioned steps are not restricted to the described order. Namely, some of the above-mentioned steps can be carried out in another order.

What is claimed is:

1. A method of managing a network which is for use in a network using SNMP(Simple Network Management Protocol) between a network management device for managing the network and a management object device connected to the network management device through the network to be managed thereby, said method comprising the steps of:
compressing a data portion of an SNMP packet transferred between said network management device and said management object device by a predetermined compression algorithm to transmit the SNMP packet including the compressed data portion; and decompressing said compressed data portion of said SNMP packet by said predetermined compression algorithm to carry out a predetermined processing on the SNMP packet.

2. A method as claimed in claim 1, wherein said network management device memorizes a plurality of said management object devices to which said predetermined compression algorithm is applicable, respectively, in a table, said network management device compressing only said SNMP packet directed to the management object device to which said predetermined compression algorithm is applicable and which is memorized in said table to form a transfer packet to be transmitted.

3. A method as claimed in claim 1, wherein a bit "1" is set on a predetermined bit position of a packet tag showing a kind of a packet to be formed in a case that said data portion has been compressed by said predetermined compression algorithm, and wherein a bit "0" is set on the predetermined bit position of the packet tag showing a kind of a packet to be formed in the other case.

4. A network management system which is for use in a network using SNMP(Simple Network Management Protocol) between a network management device for managing the network and a management device through the network to be managed thereby, comprising:

a packet which is transferred between said network management device and said management object device and which has a bit position for setting a compression indicating bit showing that said packet has been compressed by a predetermined compression algorithm; said network management device including:

a table for memorizing whether or not said predetermined compression algorithm is applicable to said management object device;

a compression/decompression processing section which investigates, by said table, whether or not said management object device connected to the network predetermined compression algorithm is applicable to said management object device as a transmission destination, when SNMP packet is transmitted from said network management device; said compression/decompression processing section compressing said packet with said compression indicating bit being set on said bit position, when said predetermined compression algorithm is applicable to said management object device as said transmission destination; said compression/decompression processing section decompressing said packet, when said compression indicating bit is set on said bit position of SNMP packet received from said management object device; and a communication processing section which adds a predetermined header to said SNMP packet to form a transfer packet; said transfer packet being transmitted to a transmission destination; said communication processing section extracting said SNMP packet from a received transfer packet; said communication processing section transmitting the extracted SNMP packet to said compression/decompression processing section, when said compression indicating bit is detected from said bit position of the extracted SNMP packet.

5. A network management system as claimed in claim 4, wherein said management object device including: a communication processing section which is connected to the network management device through the network and which adds a predetermined header to said SNMP packet generated in said management object device to form a transfer packet; said transfer packet being transmitted to a transmission destination through the network; said communication processing section extracting said SNMP packet from a transfer packet received through the network; said SNMP packet being transmitted to an internal of said management object device; and a compression/decompression processing section which compresses SNMP packet directed to said network management device with said compression indicating bit being set on said bit position; said compression/decompression processing section decompressing said SNMP packet, when said compression indicating bit is set on said bit position of SNMP packet received from said management object device.

6. A network management system as claimed in claim 5, wherein said communication processing section transmits said extracted SNMP packet to said compression/decompression processing section, in a case that said compression indicating bit is set on said bit position of the extracted SNMP packet, said communication processing section canceling said received packet in cases other than said case where said compression indicating bit is set on said bit position of the extracted SNMP packet.

* * * * *